Patented Oct. 11, 1938

2,133,245

UNITED STATES PATENT OFFICE 2,133,245

PROCESS OF MAKING CEMENTITIOUS COMPOSITION OF MATTER

Bryan F. Brice and Paul B. Brice, Cook County, Ill., assignors to Durable Materials Patent Corporation, Chicago, Ill., a corporation of Illinois No Drawing. Application June 11, 1936, Serial No. 84,726

4 Claims. (Cl. 18—47.5)

The object of this invention is to provide a novel molded cementitious body made from a base constituted of cementitious material, such as ordinary Portland cement of U. S. Government standard grade, as well as a novel process for making such cementitious bodies, which avoids the necessity of any treatment of the molded article by a long curing operation to render it available for use. Although made from constituent elements readily obtainable and low in cost, the new product is of great strength and durability. It is substantially non-hygroscopic, and being moldable in a wide variety of shapes and sizes, is well adaptable for various uses in building construction. For example, the process and materials constituting the composition are suited for the molding of a panel or wall board of excellent quality.

A cementitious body molded in accord with the invention is characterized by a cementitious base which has been subjected to substantially complete hydration promoted by the addition to the mixture containing the water and cementitious base of an accelerating agent having strong hygroscopic properties such as a halogen salt of the aluminum group of metals. Aluminum chloride has been found to be satisfactory for the purpose. The presence of the accelerating agent constitutes an important aid in promoting rapid completion of the colloidal action involved in the hydration of the cement particles and permits the use, in combination with the other constituent ingredients of the mix, of water in an amount sufficient only to obtain a thorough mixing of the constituent ingredients of the composition and not substantially in excess of the theoretical quantity of water required to effect complete hydration of the cement particles. The cementitious base, together with the water and accelerating agent, are admixed with an inert filler, fibrous material, and a thermoplastic resinous flux, preferably a heat reacting resinous flux which on completion of the molding is completely reacted to substantial infusibility. In the finished molded product, the filler, fibrous material and resinous flux are distributed throughout the cementitious mass in intimate adherent cohesion with the cement particles, the resinous flux filling the voids in the cementitious base produced as an incident to its contraction and consolidation which occurs by reason of the evaporating of any water in excess of that used in completely hydrating the cement.

A molded cementitious body having the foregoing characteristics may be made of the following specific constituent ingredients: For the cementitious base, an ordinary Portland cement of U. S. Government standard grade has been found to be satisfactory. We have discovered that blast furnace slag when pulverized to uniform grading in size of its particles provides a suitable filler for the composition. Blast furnace slag is inert; in consequence, it does not interfere with the reactions which occur during the mixing of the ingredients and final molding of the mix. Moreover, being a waste product, blast furnace slag is low in cost, yet easily obtainable, in large quantity; hence its use as a filler enables a product of superior quality to be made and sold at a low price. It has been found advantageous to use pulverized blast furnace slag of different size gradings, for example: suitable proportions as hereinafter described of blast furnace slag pulverized to 80 mesh fineness and of blast furnace slag pulverized to 40 mesh fineness. The fibrous material may be constituted of a mixture of long and short fibred asbestos, or a mixture of short fibred asbestos with relatively long fibred vegetable fibre. For the heat reacting resinous flux, an incompletely reacted phenolic resin which melts at a temperature ranging from 150° to 250° F. and reacts to substantial infusibility at about 300° F. has been found to be satisfactory.

Describing a specific process in accord with the invention for making a molded cementitious body having the above stated characteristics: In the process of manufacture, it is advantageous to mix the dry ingredients in a suitable mixing vessel, before adding the water and the accelerating agent. The dry ingredients of a typical mixture may, for example, be constituted of: 80 lbs. of Portland cement, U. S. Government standard grade; 35 lbs. of blast furnace slag ground to 40 mesh fineness; 15 lbs. of blast furnace slag ground to 80 mesh fineness; 32 lbs. of fibrous material comprising $79\frac{1}{10}\%$ of short fibred asbestos mixed with $20\frac{9}{10}\%$ of long fibred asbestos, or alternatively $79\frac{1}{10}\%$ of short fibred asbestos mixed with $20\frac{9}{10}\%$ of relatively long fibred vegetable fibre; and 6.65 lbs. of the resinous flux, such as an incompletely reacted resin of the phenolic type having the characteristics hereinabove specified. Before adding the resin to the mixture, it is pulverized with an equal proportion by weight of the 80 mesh blast furnace slag taken from the total amount used in preparing the mixture.

The entire mixing operation is carried on at ordinary atmospheric or room temperature.

Having thoroughly mixed the dry ingredients as above given, there is added to and thoroughly admixed with the dry ingredients the water for hydrating the cement together with the accelerating agent, which may be aluminum chloride as previously stated. We have found it advantageous to use 72 lbs. of water containing 10% of a 15% aqueous solution of aluminum chloride, for the proportion of dry ingredients above given. Such quantity of water is ample to provide for thorough mixing of the ingredients into a satisfactory plastic mix; supplies, in the presence of the accelerating agent, sufficient water for the substantially complete hydration of the cement and completion of the colloidal action, and yet does not provide so substantial an excess of water over that required for the completion of the hydration as to unduly prolong the molding operation wherein any excess water is removed from the mixture. The aluminum chloride is strongly hygroscopic and combines with the calcium hydroxide, formed from the reaction of the calcium oxide in the cement with the water, to form calcium chloride and aluminium hydroxide, in accord with the equation:

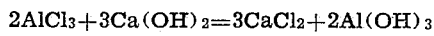

$$2AlCl_3 + 3Ca(OH)_2 = 3CaCl_2 + 2Al(OH)_3$$

The calcium chloride formed in the above reaction is likewise strongly hygroscopic and thus insures the presence of a continuous supply of water adequate for the complete hydration of the cement without any necessity for the use of water in excess of the proportionate amount above stated. The aluminium hydroxide, because of its jelly like consistency, acts as a lubricant when distributed through the mass, thereby promoting a cohesive fatty plasticity favorable to a homogeneous matting of the fibres and facilitating rolling the admixture into sheets.

Having prepared a thorough plastic mix in the manner above stated, the composition is ready for the molding operation. If it be desired to mold panel or wall board, the mixture may be extruded into a rolling mill which converts it into sheet form. From the rollers, the sheet is cut into panels approximating the size desired for molding or pressing.

The molding stage of the process involves the application of heat and pressure to the panels which are confined in a suitable press, to consolidate the composition material into a compressed homogeneous board. This stage involves combined use of three factors, namely: (1) the application of gradually increasing pressure intermittently to the composition material confined in the press; (2) the application of external heat; and (3) the control of the applied temperature to produce in the confined mass an internal temperature which rises gradually above the vaporization point of any excess uncombined water in the mass and ultimately attains a final temperature approximating the point at which the resinous flux reacts to substantial infusibility.

In the instance of the use of phenolic resin having the properties above stated, the internal temperature in the composition material while undergoing the pressing should be elevated to about 300° F., which is substantially equal to the final reaction temperature of the resin. However, the temperature in the mass should never be elevated sufficiently to break down the cement colloid. Under the concurrent conditions of external heat, pressure, and the internal heat in the composition material, any excess uncombined water is vaporized and converted into steam during the earlier stages of the pressing operation and the steam in excess of any used in the hydration of the cement is allowed to pass out of the confined mass of the composition material.

The presence in the mass of composition material under pressure of the hygroscopic reaction product of the accelerating agent, in the present instance calcium chloride, insures the retention of sufficient water in the mass to satisfy the colloidal action occurring in the cement particles, since the reaction product has the capacity to absorb more water as the latter combines with the cement particles. Moreover, the condition of superheated steam under pressure throughout the mass of material places the cement particles under pressure, thereby accelerating penetration of the cement particles by the water and promoting complete hydration of the cement into colloidal form.

As the excess uncombined water is driven off, the hydrated cement shrinks in volume and is consolidated into a dense hard mass. The shrinkage in volume of the cement causes minute voids or fissures to occur in its structure, and, as they occur, the voids are penetrated by the resinous flux which melts before the mass attains its final temperature, namely, at a melting temperature ranging between 150° and 250° F. The resin flows through the mass and together with the cement binds the whole together, the inert filler, fibrous material, cement and resin being ultimately consolidated into a compact homogeneous solid. The pressure and internal temperature are increased gradually with intervening intervals of relatively released pressure, thereby providing breathing intervals, which allow the vapor resulting from the evaporation of any excess water to escape. This operation is continued with gradual increase of pressure, until there is no apparent further escape of vapor, at which time the final pressure is applied and the final internal temperature is developed approximating the temperature at which the resin reacts to substantial infusibility. The final stage is continued until the composition material is consolidated into a compact, compressed, homogeneous solid.

After the final pressure has been applied, the solid board in the press is rapidly cooled before removing it from the press. The cooling may be effected by shutting off the steam and running cold water through the steam channels of the press, in a manner well understood in the art of molding composition materials. When cooled, the board may be removed without sticking from the press. The completed panel or wall board is constituted of a compact, hard, homogeneous mass of great tensile and shear strength, in which the constituent ingredients thereof are in intimate adherent cohesion and the cementitious base is substantially completely hydrated. The board is substantially non-hygroscopic and it has the further advantage that it does not require a long curing process after its removal from the press but is immediately available for use upon cooling.

The invention may be variously embodied within the scope of the claims hereinafter made.

What is claimed is:

1. The process of making molded cementitious bodies which consists in forming at ordinary atmospheric temperature an intimate admixture containing a cementitious base, an inert filler, fibrous material, a resinous flux which reacts to substantial infusibility, water in an amount adequate to produce a plastic mix but not substantially in excess of the amount required to effect complete hydration of the cement, and a hygroscopic accelerating agent reactant with the cement hydrate to produce a hygroscopic reaction product, and subjecting a confined mass of such admixture to gradually increasing heat and pressure until any uncombined excess water is driven off the mass and said mass attains a final temperature not less than that at which the resinous flux reacts to substantial infusibility and is consolidated into a compact homogeneous non-hygroscopic solid in which the cementitious base is substantially completely hydrated at the conclusion of the pressing operation and substantially free from uncombined water and the resinous flux penetrates the voids in said cementitious base resulting from its hydration.

2. The process of making molded cementitious bodies which consists in forming at ordinary atmospheric temperature an intimate admixture containing a cementitious base, an inert filler, fibrous material, a resinous flux which reacts to substantial infusibility, water in an amount adequate to produce a plastic mix but not substantially in excess of the amount required to effect complete hydration of the cement, and a halogen salt of the aluminium group of metals, and subjecting a confined mass of such admixture containing the hygroscopic reaction product of such halogen salt to gradually increasing heat and pressure until any uncombined excess water is driven off the mass and said mass attains a final temperature not less than that at which the resinous flux reacts to substantial infusibility and is consolidated into a compact homogeneous non-hygroscopic solid in which the cementitious base is substantially completely hydrated at the conclusion of the pressing operation and substantially free from uncombined water and the resinous flux penetrates the voids in said cementitious base resulting from its hydration.

3. The process of making molded cementitious bodies which consists in forming at ordinary atmospheric temperature an intimate admixture containing a cementitious base, an inert filler, fibrous material, a resinous flux which reacts to substantial infusibility, water in an amount adequate to produce a plastic mix but not substantially in excess of the amount required to effect complete hydration of the cement, and aluminium chloride, and subjecting a confined mass of such admixture containing the hygroscopic reaction product of said aluminium chloride to gradually increasing heat and pressure until any uncombined excess water is driven off the mass and said mass attains a final temperature not less than that at which the resinous flux reacts to substantial infusibility and is consolidated into a compact homogeneous non-hygroscopic solid in which the cementitious base is substantially completely hydrated at the conclusion of the pressing operation and substantially free from uncombined water and the resinous flux penetrates the voids in said cementitious base resulting from its hydration.

4. The process of making molded cementitious bodies which consists in forming at ordinary atmospheric temperature an intimate admixture containing a Portland cement base, an inert filler, fibrous material, a flux constituted of an incompletely reacted phenolic resin which reacts to substantial infusibility at a temperature in excess of 212° F., water in an amount adequate to produce a plastic mix but not substantially in excess of the amount required to effect complete hydration of the cement, and aluminium chloride, and subjecting a confined mass of such admixture containing the hygroscopic reaction product of said aluminium chloride to gradually increasing heat and pressure until any uncombined excess water is driven off the mass and said mass attains a final temperature not less than that at which the resinous flux reacts to substantial infusibility and is consolidated into a compact homogeneous non-hygroscopic solid in which the cementitious base is substantially completely hydrated at the conclusion of the pressing operation and substantially free from uncombined water and the resinous flux penetrates the voids in said cementitious base resulting from its hydration.

BRYAN F. BRICE.
PAUL B. BRICE.